United States Patent [19]
Theders

[11] Patent Number: 5,925,418
[45] Date of Patent: Jul. 20, 1999

[54] FINISHING SWIMMING CAPS, AND COMPOSITIONS AND METHODS FOR PRODUCING SAME

[76] Inventor: John B. Theders, 26881 Mirlo Cir., Mission Viejo, Calif. 92691

[21] Appl. No.: 08/966,184

[22] Filed: Nov. 7, 1997

Related U.S. Application Data

[62] Division of application No. 08/679,107, Jul. 12, 1996, Pat. No. 5,724,671.

[51] Int. Cl.⁶ .................................................. B05D 5/08
[52] U.S. Cl. ........................ 427/354; 427/387; 2/161.7; 2/168; 2/169; 2/171; 2/200.2; 2/202
[58] Field of Search ..................................... 427/387, 353, 427/354; 2/68, 161.7, 171, 202, 200.1, 200.2, 167, 168, 169

[56] References Cited

U.S. PATENT DOCUMENTS

| | | |
|---|---|---|
| 1,877,411 | 9/1932 | Lower . |
| 2,029,379 | 2/1936 | L'hollier et al. . |
| 2,324,735 | 7/1943 | Spanel . |
| 2,335,139 | 11/1943 | Wright . |
| 2,528,980 | 11/1950 | Spanel . |
| 2,789,933 | 4/1957 | Bargmeyer . |
| 3,411,982 | 11/1968 | Kavalir et al. . |
| 3,936,578 | 2/1976 | Dumoulin et al. . |
| 4,143,423 | 3/1979 | Sternlieb . |
| 4,146,932 | 4/1979 | Kalbas . |
| 4,310,928 | 1/1982 | Joung . |
| 4,499,154 | 2/1985 | James et al. ................................. 2/167 |
| 4,575,476 | 3/1986 | Podell et al. ................................. 2/167 |
| 4,851,266 | 7/1989 | Momose et al. . |
| 4,911,974 | 3/1990 | Shimizu et al. . |
| 5,126,334 | 6/1992 | Fitt et al. . |
| 5,346,892 | 9/1994 | Fitt et al. . |
| 5,534,350 | 7/1996 | Liou . |
| 5,571,219 | 11/1996 | Gorton . |
| 5,756,214 | 5/1998 | Waldron et al. ......................... 427/155 |
| 5,766,771 | 6/1998 | Merkel et al. .......................... 428/447 |

FOREIGN PATENT DOCUMENTS 9-135922  5/1997  Japan .

*Primary Examiner*—Erma Cameron
*Attorney, Agent, or Firm*—Frank J. Uxa

[57] ABSTRACT

Swimming caps having enhanced non-stick properties, and compositions and methods useful in producing such caps are disclosed. The present methods comprise contacting at least a portion of the outer surface of a swimming cap with a mixture comprising water, a reactable silicon-containing component and a starch component to form a coated swimming cap including a coating of the mixture on at least a portion of the outer surface of the swimming cap; and subjecting said coated swimming cap to conditions effective to remove water from the coating and to form a finished swimming cap having enhanced non-stick properties relative to the swimming cap prior to the contacting.

13 Claims, 1 Drawing Sheet

FINISHING SWIMMING CAPS, AND COMPOSITIONS AND METHODS FOR PRODUCING SAME

This is a division of application Ser. No. 08/679,107 filed Jul. 12, 1996 now U.S. Pat. No. 5,724,671.

BACKGROUND OF THE INVENTION

The present invention relates to swimming caps, and to compositions and methods useful in producing such caps. More particularly, the invention relates to swimming caps, preferably made at least in part of latex, which have a reduced tendency to stick together, and to compositions and methods useful in providing enhanced non-stick or anti-stick properties to such swimming caps.

Swimming caps, such as those made of latex, are often used by both competitive and casual swimmers. The outer surface of such caps is designed to be very smooth in order to reduce resistance as the swimmer moves through the water. One disadvantage of this smooth surface is that it has a tendency to stick to itself. To illustrate, after the swimmer leaves the water, he/she removes the wet cap and places it in his/her bag for storage. The cap is crumpled so that portions of the outer surface of the cap are in contact with other portions of the outer surface. As the cap dries, these contacting portions of the outer surface stick together, making it more difficult to quickly reuse the cap. The degree of sticking can be so great that attempts to undo the sticking can destroy the cap.

In the past this sticking problem has been alleviated by coating the outer surface of the cap with powder, for example, baby powder, each time the cap is to be stored after use. Although such "powdering" is at least somewhat effective, it involves the swimmer carrying around a supply of powder, and also requires time for the swimmer to effectively treat his/her cap.

It would be advantageous to provide a system to avoid this sticking problem without having to repeatedly treat or "powder" the swimming cap.

SUMMARY OF THE INVENTION

New swimming caps, and compositions and methods useful in producing such swimming caps, have been discovered. The present swimming caps have a reduced tendency to stick without having to be repeatedly treated, for example, with baby powder, talc and the like. The present swimming caps preferably have an anti-stick finish which is long lasting, that is which remains effective after many, for example, on the order of between about 10 and about 30 or more, use/storage cycles. The present caps preferably have a longer effective use life, that is last longer in use and/or go through more use/storage cycles before tearing or otherwise being rendered ineffective, relative to a substantially identical cap without the anti-stick finish. The present compositions are relatively straightforward and often involve novel combinations of readily available, for example, commercially available, materials. The present compositions and methods have been found to be both performance effective and cost effective in producing non-stick swimming caps. The present methods are straightforward and are easy to practice. In short, the present invention provides a very effective and efficient approach to providing non-stick swimming caps which advantageously reduces the time and effort required to care for swimming caps after use.

In one broad aspect, the present invention involves methods for providing a finish on a swimming cap comprising forming a coated swimming cap and subjecting the coated cap to conditions effective to form a finished swimming cap. At least a portion, preferably a major portion (that is at least about 50%) and more preferably substantially all, of the outer surface of a swimming cap, preferably a swimming cap made at least in part of latex, for example, natural latex, is contacted with a mixture or composition to form the coated cap which includes a coating of the mixture or composition.

The composition used in this contacting step comprises water, preferably a major amount, that is at least about 50%, by weight of water; a reactable silicon-containing component, preferably a reactable siloxane component; a starch component, and preferably an effective amount of a surfactant component. The starch component is present in an amount effective to provide enhanced non-stick properties to the surface of the swimming cap contacted with the composition. The reactable silicon-containing component is preferably effective in prolonging the enhanced non-stick properties.

The coated cap is subjected to conditions, preferably elevated temperature, that is at least about 150° F. or about 215° F., conditions, effective to remove water from the coating on the cap and to form a finished swimming cap having enhanced non-stick properties relative to the swimming cap prior to the contacting. Preferably, this subjecting step is effective so that the finished swimming cap has enhanced non-stick properties which are maintained for a longer period of time relative to a substantially identical finished swimming cap produced without the starch component and/or without the reactable silicon-containing component.

In one particularly useful embodiment, the present methods further comprise contacting the finished cap with an aqueous medium, for example, liquid water, at conditions effective to remove starch component from the finished cap and form a final finished cap. Although a portion of the starch component is removed, the advantageous non-stick properties of the final finished cap remain substantially unchanged relative to the finished cap.

Swimming caps including finishes as described herein are included within the scope of the present invention. In one embodiment, the swimming cap comprises a cap body and a finish. The cap body, preferably made at least in part of latex, includes a cap-shaped member having an inner surface and an opposing outer surface. The finish is located on or near the outer surface and is formed from a composition comprising a reactable silicon-containing component in an amount effective to form a coating including at least one of the reactable silicon-containing component and a product thereof on or near the outer surface of the cap shaped member, and a starch component present in an amount effective in providing enhanced non-stick properties to the outer surface of the cap member. The swimming cap preferably has enhanced non-stick properties relative to a similar swimming cap without the finish.

These and other aspects and advantages of the present invention are set forth in the following detailed description, examples and claims, particularly when considered in conjunction with the accompanying drawings in which like parts bear like reference numerals.

DETAILED DESCRIPTION OF THE INVENTION

Figure 1:
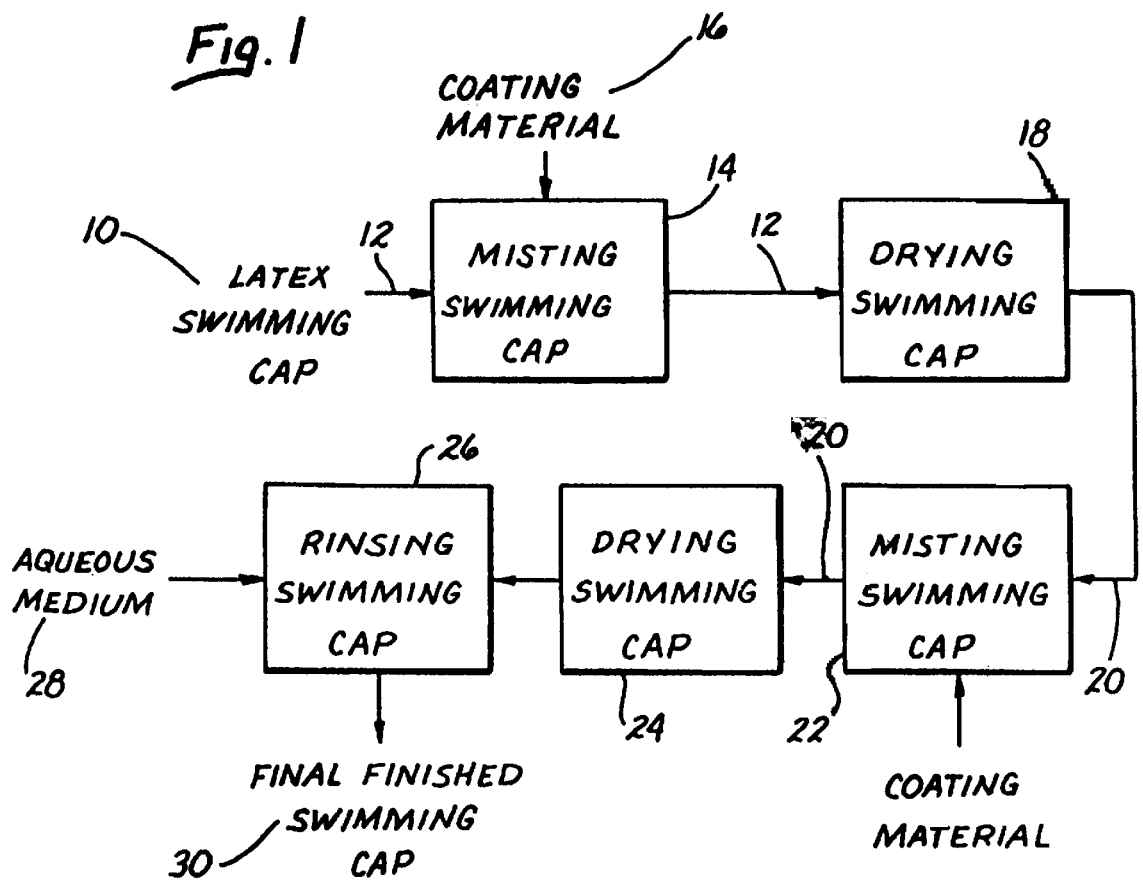
FIG. 1 is a schematic flow diagram of an embodiment of a method in accordance with the present invention.

The present invention is applicable to providing non-stick or anti-stick properties to all types of swimming, bathing and shower caps and other caps which are periodically used on one's head in the presence of water, for example, water including a disinfecting amount of chlorine. All such caps are referred to herein as swimming caps. Particularly suitable swimming caps are those made at least in part, and more preferably substantially completely from latex, such as natural or naturally occurring latex.

The present methods involve contacting at least a portion, preferably substantially all, of the outer surface of a swimming cap with a composition comprising water, a reactable silicon-containing component and a starch component, and preferably a surfactant component, to form a coated swimming cap including a coating of the composition on at least a portion, preferably substantially all, of the outer surface of the swimming cap. The coated swimming cap is subjected to conditions effective to remove water from the coating and to form a finished swimming cap having enhanced non-stick or anti-stick properties relative to the swimming cap prior to the contacting. The finished swimming cap is preferably further contacted with an aqueous medium at conditions effective to remove starch component from the finished swimming cap and to form a final finished cap.

The mixture or composition may be contacted with the swimming cap in any suitable manner. For example, the cap may be dipped into the mixture or composition, or the mixture or composition may be brushed onto the outer surface of the cap. What is important is that a coating, preferably a substantially uniform coating, of the mixture be placed on the outer surface of the swimming cap. In one particularly useful embodiment, the mixture is sprayed or misted onto the outer surface of the swimming cap. This has been found to provide a uniform and controlled coating of the mixture on the swimming cap.

The coated cap is subjected to conditions to remove water from the coating. Such conditions preferably include a temperature of at least about 215° F., more preferably at least about 250° F. Excessive temperatures are to be avoided so that no substantial damage to the swimming cap itself occurs. For example, temperatures in the range of about 215° F. or about 250° F. to about 375° F. or about 450° F. are very useful. The presently useful conditions include a time which is sufficient, together with the other conditions, to obtain the desired results of the subjecting step without causing undue damage to the swimming cap. Subjecting times of at least about 15 seconds or about 30 seconds or about 45 seconds are preferred. Very useful subjecting times are those within the range of about 15 seconds or about 30 seconds to about 5 minutes or about 10 minutes or about 30 minutes. There is an inverse relationship between the subjecting temperature and the subjecting time. That is, the higher the temperature the shorter to time.

The subjecting conditions are not critical to the present invention and may vary over relatively wide ranges depending on, for example, the specific mixture or composition being employed and the specific swimming cap being finished. The optimum subjecting conditions can be determined for any specific application by routine experimentation.

The subjecting step can take place in any suitable manner. For example, the coated cap can be placed in an oven or similar device held at the desired temperature and for the desired period of time.

In one particularly useful embodiment schematically illustrated in FIG. 1, a flattened swimming cap 10 is positioned on a conveyor belt 12, for example, a horizontal conveyor belt, with one half of the outer surface of the cap facing the belt and the other half of the outer surface of the cap facing away from the belt. The cap 10 on the conveyor belt 12 passes a "misting" station 14 where the coating material or composition 16 is coated onto the half of the outer surface facing away from the belt. The partially coated cap, on the conveyor belt 12, is then passed to a "drying" station 18 where water is removed from the coating and a partially finished cap is formed. This partially finished cap is then dropped onto a second conveyor belt 20. In so doing, the cap 10 flips so that the other "uncoated" or "unfinished" half of the cap's outer surface is now facing away from the second conveyor belt 20. The cap, on the second conveyor belt, is then passed to a second "misting" station 22 and a second "drying" station 24 to finish this other half of the outer surface of the swimming cap 10 and form a finished swimming cap.

The finished swimming cap is preferably further contacted, at station 26 with an aqueous medium 28, for example, liquid water, to remove a portion of the starch component present on or near the outer surface of the finished swimming cap and to form a final finished cap 30, which is very suitable for sale to the consumer. This further contacting or rinsing step very conveniently and effectively occurs using tap water, for example, at temperatures of about 40° F. to about 75° F. and for a period of time in the range of about 5 seconds or about 10 seconds to about 1 minute or about 5 minutes.

Figure 2:
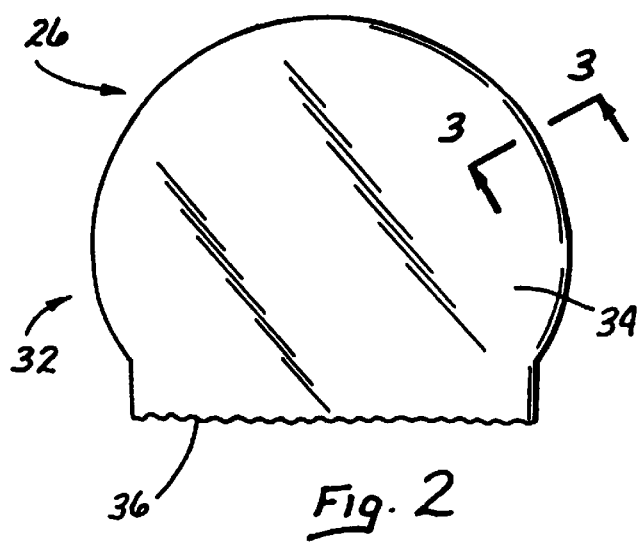
FIG. 2 is a side plan view of a swimming cap in accordance with the present invention.
Figure 3:
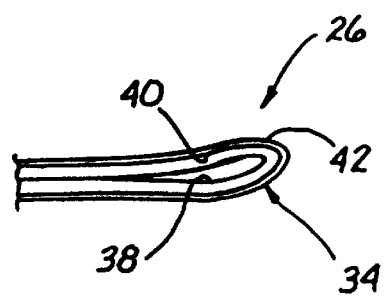
FIG. 3 is a cross-sectional view taken generally along line 3—3 of FIG. 2.

With reference to FIGS. 2 and 3, final finished swimming cap 26 includes a cap body 32 with a cap-shaped member 34 having an opening 36 through which a swimmer places the top of his/her head when cap 26 is to be worn. Cap-shaped member 34 includes an inner surface 38 and an outer surface 40. A finish 42 is located on or near outer surface 40 and is preferably secured or bonded to the outer surface. Other than finish 42, cap 26 is made of natural latex. Finish 42 is formed in accordance with the present invention from a composition comprising a reactable silicon-containing component in an amount effective to form a coating including at least one of the reactable silicon-containing component and a product thereof on or near the outer surface 40 of cap-shaped member 34 contacted with the composition, and a starch component present in an amount effective to provide enhanced non-stick properties to the outer surface of the cap-shaped member.

The reactable silicon-containing component and/or product thereof present and/or the starch component in finish 42 is believed to be effective in prolonging the enhanced anti-stick properties of the outer surface 40 of cap-shaped member 34, for example, so that substantial non-stick properties remain even after the cap is washed with water and dried a number of times, such as at least 2 or 3 times and preferably at least about 5 or about 10 times.

The present mixtures or compositions are aqueous-based, for example, aqueous-based dispersions. The water used may be tap water, although distilled, deionized or otherwise treated water may be employed. The primary function of the water is believed to be that of a vehicle by which other components of the compositions can be effectively placed on the swimming cap. The water preferably comprises at least about 50% or at least about 70% by weight of the mixture or composition.

The reactable silicon-containing component is present in an amount effective to form a coating including the reactable silicon-containing component on the surface, for example, the outer surface, of a swimming cap contacted with the composition including the reactable silicon-containing component. Any suitable reactable silicon-containing component may be employed provided that it functions as described herein and, together with the other components of the present compositions in accordance with the present methods provides the desired enhanced non-stick or anti-stick properties to the swimming cap.

The exact mechanism by which the reactable silicon-containing component functions to at least assist in providing the desired non-stick or anti-stick properties is at present not fully understood. However, it is believed that this component undergoes a chemical reaction and/or other interaction or interactions with itself and/or the starch component and/or the swimming cap, for example, the latex in the swimming cap in accordance with the present invention. Although the reactable silicon-containing component may form a cross-linked product, chemical reactions or interactions other than cross-linking to form a three-dimensional network are useful. In particular, it is believed that the reactable silicon-containing component reacts or interacts to form a product which is included at or near the outer surface of the finished swimming cap.

Although any reactable silicon-containing component may be employed, it is preferred that this component be based on one or more siloxanes, for example, monomeric siloxanes and/or polysiloxanes having relatively low molecular weights. The reactable groups included in this component are preferably selected from those which undergo the chemical reactions and/or other interactions which facilitate providing the desired enhanced non-stick or anti-stick properties to the swimming cap. A particularly useful reactable silicon-containing component is selected from aminoorganosiloxanes and mixtures thereof, more preferably diaminoalkyl dimethyl siloxanes and mixtures thereof, for example, wherein the aminoalkyl groups have 1 to about 4 or about 6 carbon atoms. Very good results are obtained using aminoethyl aminopropyl dimethyl siloxane.

The amount of reactable silicon-containing components included in the present compositions may vary over a wide range depending, for example, on the specific component being employed, on the specific other components present in the composition, on the specific swimming cap to be treated, on the degree of non-stick or anti-stick properties to be provided and the like factors. The amount of reactable silicon-containing component included in the present compositions often is in the range of about 0.05% to about 3% or about 5% or about 10% by weight of the composition.

In a very useful embodiment, the present compositions further comprise a non-reactive component, preferably a non-reactive silicon-containing component, for example, a non-reactive silicone polymer, in an amount effective to enhance the slickness of the finished swimming cap, for example, relative to the slickness of a substantially identical swimming cap produced without the non-reactive component. The slickness or smoothness of the finished swimming cap is important to provide increased aesthetic appeal and may also reduce friction as a swimmer wearing the finished cap moves through the water.

Although any suitable non-reactive component may be employed, it is preferred that, if such a component is used, it be selected from polyorganosiloxanes and mixtures thereof having relatively low molecular weights. A particularly useful non-reactive silicon-containing component is one or more polydimethylsiloxanes and mixtures thereof.

The amount of non-reactive components included, if at all, in the present compositions may vary over a wide range depending, for example, on the specific component being employed, on the specific other components present in the composition, on the specific swimming cap to be treated, on the degree of slickness of the swimming cap finish desired and the like factors. The amount of non-reactive component included in the present compositions is preferably less than the amount of the reactable silicon-containing component and is typically in the range of about 0.005% to about 0.3% or about 0.5% or about 1% by weight of the composition.

The starch component is effective, in providing non-stick properties, to the surface, e.g., outer surface, of a swimming cap contacted with the composition, for example, in accordance with the present invention. Any suitable starch component may be employed provided, as with the each of the other components of the present compositions, that it functions as described herein and has no substantial detrimental or interfering effect on the present compositions, methods, finished swimming caps, or on the wearers of the finished swimming caps.

One important feature which has been found is that mineral materials, such as talc, are substantially ineffective in the present invention when used in place of the starch component. Although the reason for this is not fully understood, it is believed that the reactable groups, for example, hydroxy groups, included in the starch component in some way are useful and effective. Mineral materials, such as talc, have no such reactable groups.

A particularly useful starch component is cornstarch.

The amount of starch component included in the present compositions may vary over a wide range depending, for example, on the specific starch component being employed, on the specific other components present in the composition, on the specific swimming cap to be treated, on the degree of non-stick or anti-stick properties to be provided and the like factors. The amount of starch component included in the present compositions often is in the range of about 0.5% or about 1% to about 10% or about 20% by weight of the composition. Some excess starch component may be included in the present compositions. This excess starch component is preferably removed by rinsing the finished cap in water.

The present compositions preferably further include a component, for example, selected from tricalcium phosphate and the like, which is effective to enhance the dispersement of the starch component in the composition. This component is preferably combined with the starch component prior to combining the starch component into the present compositions. This component may be effective to maintain the starch component as a free-flowing powder so that it can be more easily and effectively dispersed in the present compositions. This component may be present in an amount of about 0.1% or about 0.3% to about 5% or about 10% by weight of the starch component present in the present composition.

A surfactant component is preferably present in the present mixtures or compositions in an effective amount. One important function of the surfactant component is to facilitate maintaining the other components dispersed in the present mixtures or compositions and/or to facilitate maintaining the present mixtures or compositions uniform. In addition, the surfactant component preferably at least assists in providing a more uniform coating of the mixture or composition on the outer surface of the swimming cap.

Any suitable surfactant component may be employed in the present mixtures or compositions provided that it functions as described herein and has no undue adverse or detrimental effect on the mixtures or compositions, on the swimming cap being treated or on the non-stick or anti-stick properties obtained in accordance with the present invention.

The surfactant component may be a single chemical compound or a mixture or combination of two or more compounds. The surfactant component may be nonionic, anionic, cationic, amphoteric or combinations of compounds having different ionic character. An especially useful surfactant component includes a combination of a cationic surfactant material and a nonionic surfactant component.

The surfactant art is replete with many, many examples of specific nonionic, anionic, cationic and amphoteric surfactants. Therefore, an exhaustive list of such materials need not be presented here. The amount of the surfactant component included in the present mixtures or compositions may range widely depending, for example, on the specific surfactant component being employed and on the specific mixture or composition in which it is to be included. Typical amounts of surfactant component are within the range of about 0.01% or about 0.1% to about 1% or about 5% by weight of the mixture or composition.

In one particularly useful embodiment at least a portion of the surfactant component is a cationic quaternary ammonium material. Although its function is not at present completely understood, it has been found that a mixture or composition including such a cationic material provided very useful non-stick or anti-stick properties to a swimming cap in accordance with the present invention.

Without wishing to limit the invention to any particular theory of operation, it is believed that the quaternary ammonium material may react or otherwise interact with the starch component, thereby forming a starch component derivative which at least assists in providing the swimming cap with enhanced non-stick or anti-stick properties, for example, relative to treatment with a substantially identical mixture or composition without the quaternary ammonium material.

Preferably, the quaternary ammonium material includes (4) hydrocarbyl radicals bonded to a single nitrogen atom. One or more of the hydrocarbyl radicals, which preferably each have 1 to about 20 or about 30 carbon atoms, may be substituted with one or more other groups including elements other than carbon and hydrogen. The associated anion may be any suitable, substantially non-interfering anion, with halide, in particular chloride, being preferred.

The following non-limiting examples illustrate certain aspects of the present invention.

The following materials were used to produce the compositions for testing:

Material A—A commercially available water proofing material, which is silicone-based and is sold by Sherwin Williams under the trademark KRYLON industrial silicone spray.

Material B—Water

Material C—Talc having a particle size comparable to that of baby powder.

Material D—Cornstarch having a particle size comparable to that of baby powder.

Material E—Cornstarch including 2% by weight of tricalcium phosphate. This material had a particle size comparable to that of baby powder.

Material F—An aqueous emulsion containing about 60% by weight of polydimethylsiloxane; and about 5% by weight of 2,6,8 trimethyl-4-nonyloxyethyleneoxyethanol. This material was provided by Dow Corning and designated Dow Corning 346 Silicone Emulsion.

Material G—An aqueous emulsion containing about 5% by weight of trimethyltallowalkyl-ammonium chloride; about 5% by weight polyethylene glycol nonylphenol; and about 5% by weight aminoethylaminopropyl, dimethyl siloxane. This material was provided by Dow Corning and designated Dow Corning 929 Cationic Emulsion.

Each of the compositions that was produced was tested in accordance with the following.

A standard, natural latex swimming cap was flattened so that one half of the outer surface of the cap faced in one direction and the other half of the outer surface faced in the opposing direction. The flattened cap was placed on a conveyor belt. A mist of the composition was provided and applied to one side of the outer surface of the cap. The cap was then subjected to forced air drying at 350° F. for 90 seconds. The cap was then dropped onto another conveyor belt to expose the other side of the cap to the mist, and the misting/drying steps were repeated.

EXAMPLE 1 (COMPARATIVE)

A mixture of 5% by weight Material C and 95% by weight Material B was tested.

The resulting swimming cap was very non-stick, for example, much more non-stick than the original cap. However, after the swimming cap was immersed in water, the beneficial non-stick property was lost.

EXAMPLE 2 (COMPARATIVE)

A mixture of 5% by weight Material E and 95% by weight Material B was tested.

The resulting swimming cap was very non-stick, for example, much more non-stick than the original cap. However, after the swimming cap was immersed in water, the beneficial non-stick property was lost.

EXAMPLE 3 (COMPARATIVE)

Material A was tested.

The resulting swimming cap was prone to becoming sticky to substantially the same degree as the original swimming cap. The silicone from Material A appeared to stay on the swimming cap fairly long, even after being repeatedly immersed in water.

EXAMPLE 4 (COMPARATIVE)

A mixture containing about 5% by weight of Material F and about 95% by weight Material B was tested.

The resulting swimming cap was similar to the cap produced in Example 3. In addition, the cap was left with an oily feel.

EXAMPLE 5 (COMPARATIVE)

A mixture containing about 5% by weight of Material F, about 15% by weight of Material C and about 80% by weight of Material B was tested.

The resulting swimming cap initially had a very good non-stick finish. However, when the cap was washed in water, it became sticky.

EXAMPLE 6 (COMPARATIVE)

Example 5 was repeated except Material E was used in place of Material C.

The resulting swimming cap was similar to the cap produced in Example 5.

EXAMPLE 7 (COMPARATIVE)

A mixture containing about 5% by weight of Material G and 95% by weight of Material B was tested.

The resulting swimming cap initially had a very slick, non-stick finish. However, this finish did not last and was lost upon the cap being washed in water.

EXAMPLE 8

A mixture containing about 15% by weight of Material E, about 5% by weight of Material G and about 80% by weight of Material B was tested.

The resulting swimming cap had a very slick, non-stick finish which remained on the cap even after being repeatedly immersed in water.

EXAMPLE 9

A mixture containing about 5% by weight of Material F, about 5% by weight of Material G, about 15% by weight of Material E and about 75% by weight of Material B was tested.

The resulting swimming cap had an oily feel.

EXAMPLE 10

A mixture containing about 1% by weight of Material G, about 0.04% by weight of Material F, about 5% by weight of Material D and about 95% by weight of Material B was tested.

The resulting swimming cap had a somewhat slick finish which provided limited non-stick characteristics.

EXAMPLE 11

Example 10 was repeated except that Material E replaced Material D.

The resulting swimming cap had a long lasting very slick finish and very effective non-stick characteristics. The inclusion of a small amount of tricalcium phosphate appears to enhance the finish and non-stick characteristics of the swimming cap.

EXAMPLE 12

Example 8 and 11 were repeated except that the cap was processed twice as outlined above.

In each instance, the second application improved the slick finish and non-stick characteristics of the resulting swimming cap relative to the caps from Examples 8 and 11.

While this invention has been described with respect to various specific examples and embodiments, it is to be understood that the invention is not limited thereto and that it can be variously practiced within the scope of the following claims.

What is claimed is:

1. A method for providing a finish on a swimming cap comprising the steps of:
   contacting at least a portion of the outer surface of a swimming cap with a mixture comprising water, a reactable silicon-containing component and a starch component to form a coated swimming cap including a coating of said mixture on at least a portion of the outer surface of said swimming cap; and
   subjecting said coated swimming cap to conditions effective to remove water from said coating and to form a finished swimming cap having enhanced non-stick properties relative to said swimming cap prior to said contacting.

2. The method of claim 1 wherein said subjecting is conducted at elevated temperature and is effective so that said finished swimming cap has enhanced non-stick properties which are maintained for a longer period of time relative to a substantially identical finished swimming cap produced without one of said starch component and said reactable silicon-containing component.

3. The method of claim 1 wherein said mixture further comprises an effective amount of a surfactant component including a quaternary ammonium component.

4. The method of claim 1 wherein said swimming cap comprises latex and said reactable silicon-containing component comprises a material selected from the group consisting of aminoorganosiloxanes and mixtures thereof.

5. The method of claim 1 wherein said starch component is cornstarch.

6. The method of claim 1 wherein said conditions include a temperature of at least about 215° F. and a time of at least about 30 seconds.

7. The method of claim 1 wherein said mixture includes an effective amount of tricalcium phosphate.

8. The method of claim 1 which further comprises contacting said finished swimming cap with an aqueous medium at conditions effective to remove starch component from said finished swimming cap and to form a final finished cap.

9. The method of claim 1 wherein said mixture further comprises a non-reactive component comprising a material selected from the group consisting of polyorganosiloxanes and mixtures thereof in an amount effective to enhance the slickness of said finished swimming cap relative to the slickness of a substantially identical finished swimming cap produced without said non-reactive component.

10. A method for providing a finish on a swimming cap comprising the steps of:
    contacting at least a portion of the outer surface of a swimming cap with a mixture comprising water, a reactable silicon-containing component and a non-mineral component including reactive hydroxy groups and being effective in providing a non-stick coating on the outer surface of said swimming cap to form a coated swimming cap including a coating of said mixture on at least a portion of the outer surface of said swimming cap; and
    subjecting said coated swimming cap to conditions effective to remove water from said coating and to form a finished swimming cap having enhanced non-stick properties relative to said swimming cap prior to said contacting.

11. The method of claim 10 wherein said swimming cap comprises latex and said reactable silicon-containing component comprises a material selected from the group consisting of aminoorganosiloxanes and mixtures thereof.

12. The method of claim 10 wherein said mixture further comprises a non-reactive component comprising a material selected from the group consisting of polyorganosiloxanes and mixtures thereof in an amount effective to enhance the slickness of said finished swimming cap relative to the slickness of a substantially identical finished swimming cap produced without said non-reactive component.

13. The method of claim 10 wherein said non-mineral component is effective in providing enhanced non-stick properties to the outer surface of said swimming cap relative to a similar finished swimming cap formed by a substantially identical method using a similar mixture without said non-mineral component.

* * * * *